(12) United States Patent
Shuster

(10) Patent No.: US 11,195,115 B2
(45) Date of Patent: Dec. 7, 2021

(54) FILE FORMAT PREDICTION BASED ON RELATIVE FREQUENCY OF A CHARACTER IN THE FILE

(71) Applicant: Red Hat Israel, Ltd., Ra'anana (IL)

(72) Inventor: Boaz Shuster, Ra'anana (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 962 days.

(21) Appl. No.: 15/901,507

(22) Filed: Feb. 21, 2018

(65) Prior Publication Data

US 2019/0258951 A1    Aug. 22, 2019

(51) Int. Cl.
*G06N 20/00*      (2019.01)
*G06N 7/00*       (2006.01)
*G06F 17/16*      (2006.01)
*G06F 16/13*      (2019.01)
*G06F 16/11*      (2019.01)

(52) U.S. Cl.
CPC .......... *G06N 7/005* (2013.01); *G06F 16/116* (2019.01); *G06F 16/13* (2019.01); *G06F 17/16* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,244,755 B2 | 1/2016 | Huang et al. | |
| 9,633,106 B1 | 4/2017 | Saurabh et al. | |
| 9,741,047 B1* | 8/2017 | Wood ................ | G06Q 30/0204 |
| 9,747,150 B2 | 8/2017 | Cooper et al. | |
| 9,811,562 B2 | 11/2017 | Tidwell et al. | |
| 2011/0271177 A1* | 11/2011 | Bastos dos Santos ..................... | G06F 40/174 715/256 |
| 2015/0094959 A1 | 4/2015 | Ning et al. | |
| 2015/0220825 A1* | 8/2015 | Oikawa .............. | H04N 1/32448 358/1.13 |
| 2017/0279840 A1 | 9/2017 | Zhang et al. | |
| 2017/0316343 A1 | 11/2017 | Shamsi et al. | |

OTHER PUBLICATIONS

Weixi Li, Automatic Log Analysis using Machine Learning, https://pdfs.semanticscholar.org/0711/4afea22ccf212ca7f31a73904e67ab40a785.pdf.

* cited by examiner

*Primary Examiner* — David R Vincent
(74) *Attorney, Agent, or Firm* — Haynes and Boone, LLP

(57) ABSTRACT

A method of predicting a format of a file includes calculating a quotient vector storing a list of values in slots. Each slot of the quotient vector and binary vector correspond to a character of a set of distinct characters based on an order. Each value in the quotient vector indicates a frequency with which the corresponding distinct character is found relative to the set of distinct characters found in a file. The method also includes calculating, based on comparing each value in the quotient vector to a threshold, a binary vector storing a list of values in slots. The method further includes predicting, based on the binary vector, a format of the file.

20 Claims, 6 Drawing Sheets

FILE FORMAT PREDICTION BASED ON RELATIVE FREQUENCY OF A CHARACTER IN THE FILE

FIELD OF DISCLOSURE

The present disclosure generally relates to a computing system, and more particularly to predicting a format of a file.

BACKGROUND

Companies may collect and process a vast amount of data. Companies collect data from a plurality of sources and store the data in files for processing, and the files may be in different formats. For example, a file may in the JavaScript® Object Notation (JSON) format, which provides for name-value pairs. In another example, a file may in the eXtensible Markup Language (XML) format, which defines a set of rules for encoding documents in a format that is both human-readable and machine-readable. The processing of a file may depend on its format.

BRIEF SUMMARY

Methods, systems, and techniques for predicting a format of a file are disclosed.

According to one example, a method of predicting a format of a file includes calculating a quotient vector storing a list of values in slots. Each slot of the quotient vector corresponds to a character of a set of distinct characters based on an order. Each value in the quotient vector indicates a frequency with which the corresponding distinct character is found relative to the set of distinct characters found in a file. The method also includes comparing each value in the quotient vector to a threshold. The method further includes calculating, based on comparing each value in the quotient vector to the threshold, a binary vector storing a list of values in slots. Each slot of the binary vector corresponds to a character of the set of distinct characters based on the order. A slot of the binary vector stores a first value if the respective slot of the quotient vector satisfies the threshold, and a slot of the binary vector stores a second value if the respective slot of the quotient vector does not satisfy the threshold. The method also includes predicting, based on the binary vector, a format of the file.

According to one example, a system for predicting a format of a file includes a vector module that calculates a quotient vector storing a list of values in slots. Each slot of the quotient vector corresponds to a character of a set of distinct characters based on an order, and each value in the quotient vector indicates a frequency with which the corresponding distinct character is found relative to the set of distinct characters found in a file. The vector module compares each value in the quotient vector to a threshold and calculates, based on comparing each value in the quotient vector to the threshold, a binary vector storing a list of values in slots. Each slot of the binary vector corresponds to a character of the set of distinct characters based on the order. A slot of the binary vector stores a first value if the respective slot of the quotient vector satisfies the threshold, and a slot of the binary vector stores a second value if the respective slot of the quotient vector does not satisfy the threshold. The system also includes a prediction module that predicts, based on the binary vector, a format of the file.

A machine-readable medium comprising a plurality of machine-readable instructions that when executed by one or more processors is adapted to cause the one or more processors to perform a method comprising: calculating a quotient vector storing a list of values in slots, each slot of the quotient vector corresponding to a character of a set of distinct characters based on an order, and each value in the quotient vector indicating a frequency with which the corresponding distinct character is found relative to the set of distinct characters found in a file; comparing each value in the quotient vector to a threshold; calculating, based on comparing each value in the quotient vector to the threshold, a binary vector storing a list of values in slots, each slot of the binary vector corresponding to a character of the set of distinct characters based on the order, where a slot of the binary vector stores a first value if the respective slot of the quotient vector satisfies the threshold, and a slot of the binary vector stores a second value if the respective slot of the quotient vector does not satisfy the threshold; and predicting, based on the binary vector, a format of the file.

Figure 1:
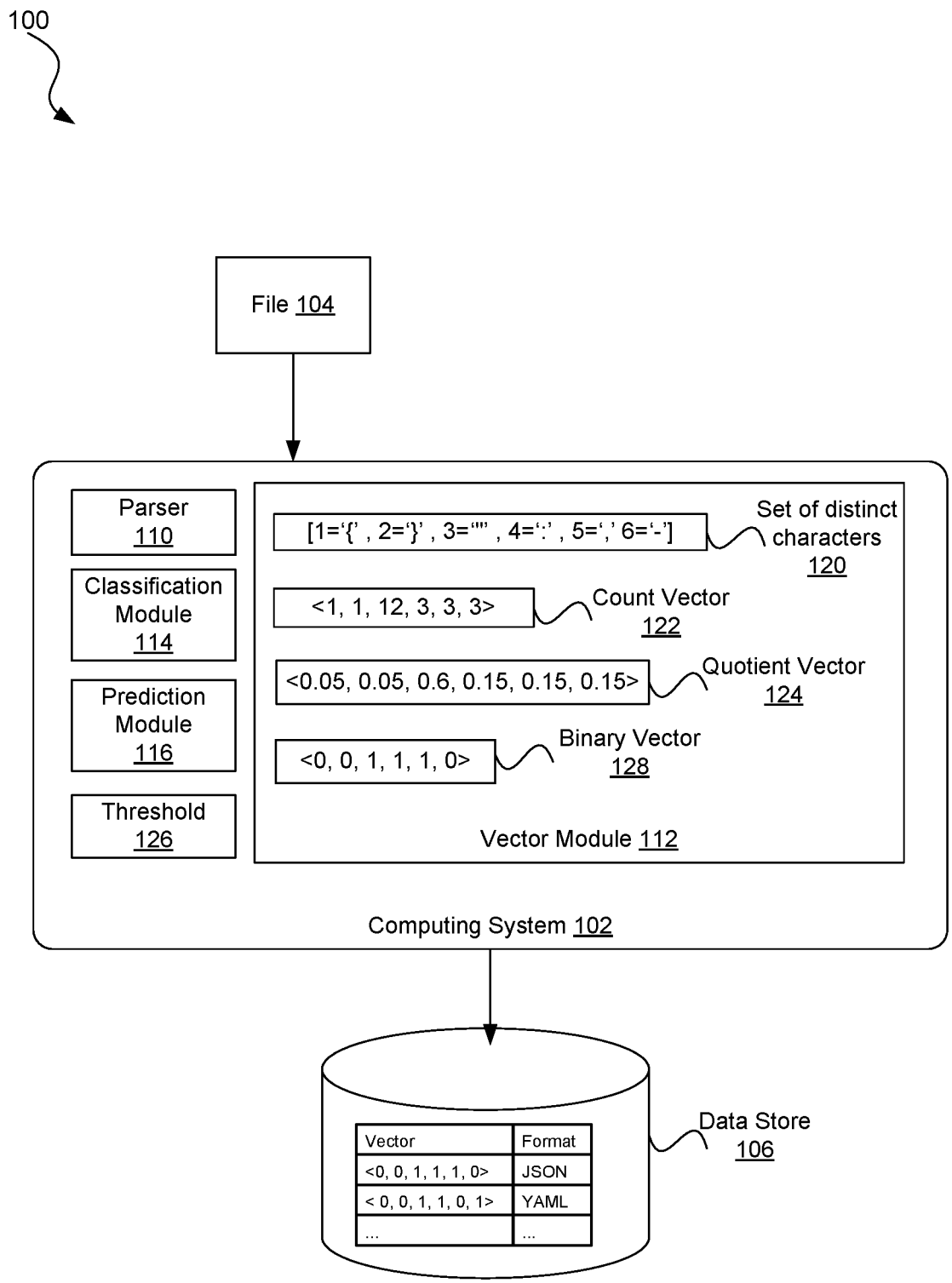
FIG. 1 is a system diagram for generating vectors for use in classifying one or more files as being in a particular format and/or for use in predicting a format of a file, according to one example of principles described herein.

In the figures, elements having the same designations have the same or similar functions.

DETAILED DESCRIPTION

I. Overview
II. Example System Architecture
   A. Calculate Vectors
     1. Count Vector
     2. Quotient Vector
     3. Binary Vector
   B. Classify File as Being Specific to a Given Format
III. Predict Format of a File
   A. Binary Vector that Represents the File is Found in the Data Store
   B. Binary Vector that Represents the File is Not Found in the Data Store
IV. Example Methods
   A. Predict a File Format Based on a Binary Vector that Represents the File
   B. File is Specific to a Console Format
V. Example System Flow

I. OVERVIEW

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Companies collect data from a plurality of sources, and the data may be stored in different formats. For example, a file may in the JavaScript® Object Notation (JSON) format, which provides for name-value pairs. In another example, a file may in the eXtensible Markup Language (XML) format, which defines a set of rules for encoding documents in a format that is both human-readable and machine-readable. All trademarks are the properties of their respective owners.

Programs such as a file processor may be used to collect and/or process files. In an example, a file may be a log file that stores test results, a financial file that stores a company's financial information, etc. In the present disclosure, a file may also be referred to as a log file. The file processor may unify the data collection and consumption for a better use and understanding of the data. The processing of a file may depend on its format. In an example, the file processor analyzes the first line of a JSON file different from the first line of an Apache® file. An example of a file processor is Fluentd®, which decouples data sources from backend systems by providing a unified logging layer in between. The layer allows developers and data analysts to utilize many types of logs as they are generated. Multiple fluentd instances may run, and each instance may be responsible for parsing and processing a specific file format. For example, a first fluentd instance may parse and process only Apache logs, a second fluentd instance may parse and process only XML files, etc.

A user may review a file to determine its format. Once the file format is determined, the user may label the file with its corresponding format and submit the file to the correct file processor. The correct file processor is the file processor that is specific to the format and can parse the file in accordance with the format. In an example, a program developer runs multiple tests, and the test results are output to a plurality of files. This is merely an example and files may contain data other than test results. The program developer provides the plurality of files to a program tester for processing so that data from the files may be collected and analyzed. The program tester may use a plurality of services for processing the files, where each service is specific to a particular format. For example, if a file is a JSON file, the program tester submits the JSON file to a JSON fluentd instance that processes the file in accordance with the JSON format, and if the file is an Apache log file, the program tester submits the Apache file to an Apache fluentd instance that processes the file in accordance with the Apache format. Due to the vast amount of data that a single company may process, a user may review hundreds of files a day. A problem with this approach of a user tagging the file with its format is that it may be time consuming for the user to review multiple files, determine their format(s), and label the files as such.

A solution to solve the above described problem may involve providing a computing system with a training set including files and their associated formats. At a subsequent point in time, the computing system may receive a file, use the training set to predict file's format, and route the file to the correct file processor (e.g., fluentd instance). Using a data set to train the computing system may save a large amount of time and allow data to be collected and seamlessly stored in a database, which may be queried by users.

An example method of predicting a format of a file includes calculating a quotient vector storing a list of values in slots. Each slot of the quotient vector corresponds to a character of a set of distinct characters based on an order, and each value in the quotient vector indicates a frequency with which the corresponding distinct character is found relative to the set of distinct characters found in a file. The method also includes comparing each value in the quotient vector to a threshold. The method further includes calculating, based on comparing each value in the quotient vector to the threshold, a binary vector storing a list of values in slots. Each slot of the binary vector corresponds to a character of the set of distinct characters based on the order, where a slot of the binary vector stores a first value if the respective slot of the quotient vector satisfies the threshold, and a slot of the binary vector stores a second value if the respective slot of the quotient vector does not satisfy the threshold. The method also includes predicting, based on the binary vector, a format of the file.

Unless specifically stated otherwise, as apparent from the following discussion, it is appreciated that throughout the description, discussions utilizing terms such as "determining," "calculating," "analyzing," "receiving," "sending," "comparing," "predicting," "identifying," "classifying," "storing," "searching," "computing," "extracting," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

II. EXAMPLE SYSTEM ARCHITECTURE

FIG. 1 is a system diagram 100 for generating vectors for use in classifying one or more files as being in a particular format and/or for use in predicting a format of a file, according to one example of principles described herein. According to the present example, a computing system 102 includes a parser 110, a vector module 112, a classification module 114, and a prediction module 116. The computing system 102 may accept one or more files 104 and be coupled to a data store 106.

In some examples, a data store may be any standard or proprietary data store software, such as Oracle® Microsoft Access®, SyBase®, or DBase II, for example. The data store may have fields, records, data, and other data store elements that may be associated through data store specific software. In several examples, data may be mapped. In some examples, mapping is the process of associating one data entry with another data entry. In an example, a binary vector may be mapped to a format specific to the binary vector. In some examples, the data store may exist remotely from the computing system 102 and run on a separate platform. In some examples, the data store may be accessible across the Internet. Additionally, more than one data store may be implemented.

The computing system 102 may be one of a variety of electronic computing devices. For example, the computing system 102 may be a desktop computing device, laptop computing device, tablet device, or a mobile phone device. The computing system 102 provides output systems, such as a monitor or touchscreen device, for display to a user. The computing system 102 also provides input systems, such as a touchscreen, keyboard, or mouse, to receive information from the user.

The parser 110 parses the file 104, which stores one or more characters. A character may be an alphanumeric character or a non-alphanumeric character. A character is an alphanumeric character if the character is a letter in the alphabet or a number. In an example, the file 104 is a log file. Table A provides an example of the file 104:

TABLE A

```
sample1.txt {
"hostname": "eu-12-app-1",
"exceptions": 2,
"exception_list": [ "KeyError", "Agent.Off" ]
}
```

The vector module 112 identifies a set of distinct characters 120, which is arranged in the following order: the first element is "{", the second element is "}", the third elements is """, the fourth element is ":", the fifth element is ",", and the sixth element is "—". Each character of the set of distinct characters 120 may be a non-alphanumeric character. The parser 110 determines the number of occurrences in which any given character is found in the file.

A. Calculate Vectors

As will be explained further below, the vector module 112 calculates vectors that assist the classification module 114 in classifying a file as being specific to a particular format. The information provided by the classification module 114 may be used as a training set to assist the prediction module 116 in predicting the format of one or more files. The training set trains the classification module 114 and the prediction module 116 to recognize formats using the techniques provided in the present disclosure.

The vector module 112 calculates vectors for a file. A vector has a plurality of slots, where each slot stores a value that is based at least on the content in the file and the order of characters of the set of distinct characters 120. A number of slots in a vector may be equal to the number of characters in the set of distinct characters 120 (e.g., six). A character of the set of distinct characters 120 may or may not be found in the file. Additionally, each slot of the vector corresponds to a character of the set of distinct characters 120 based on the order. A value and the slot in which the value is stored correspond to the same character. For example, the first slot of a vector corresponds to the first element "{", the second slot of the vector corresponds to the second element "}", the third slot of the vector corresponds to the third element """, the fourth slot of the vector corresponds to the fourth element ":", the fifth slot of the vector corresponds to the fifth element ",", and the sixth slot of the vector corresponds to the sixth element "—" of the set of distinct characters 120.

1. Count Vector

In an example, the vector module 112 calculates, based on the file 104, a count vector 122 storing a list of values in a plurality of slots. Each slot of the count vector 122 corresponds to a character of the set of distinct characters 120 based on the order, and each value in the count vector 122 represents a number of times the respective character is found in the file. The order of the list of values in a vector is important because each value corresponds to a particular character and provides information about the corresponding character. Referring to Table A, the example file has one occurrence of the first element "{", one occurrence of the second element "}", twelve occurrences of the third element """, three occurrences of the fourth element ":", three occurrences of the fifth element ",", and three occurrences of the sixth element character "—" of the set of distinct characters 120. Accordingly, the count vector 122 is <1, 1, 12, 3, 3, 3>.

In an example, the vector module 112 uses a model such as the Bag-of-words model, which uses the frequency with which a character or word occurs as a feature for training the classification module 114 and the prediction module 116. The classification module 114 may transform the characters and/or words stored in the file into a "bag of words," and calculate the frequency or number of times a character and/or word appears in the file. Referring to the set of distinct characters 120, the vector module 112 may specify the number of times a character of the set of distinct characters 120 is found in the file. In an example, each character of the set of distinct characters 120 is a non-alphanumeric character. The frequency with which some non-alphanumeric characters occur in the file relative to others may indicate a probability that the file is or is not specific to a particular format.

Each file may have its own "dialect" represented by particular characters. For example, the structure of a JSON file may have a large number of the """, ":", and "," non-alphanumeric characters, and the structure of an XML file may have a large number of the "<" and ">" alphanumeric characters relative to other non-alphanumeric characters in the file.

2. Quotient Vector

The vector module 112 calculates, based on the count vector 122, a quotient vector 124 storing a list of values in a plurality of slots. Each slot of the quotient vector 124 corresponds to a character of the set of distinct characters 120 based on the order. Accordingly, each slot of the quotient vector 124 corresponds to the same character as the respective slot of the count vector 122. Each value in the quotient vector 124 indicates a frequency with which the corresponding distinct character is found relative to the set of distinct characters 120 found in the file 104. To calculate the quotient vector 124, for each value stored in the count vector 122, the vector module 112 divides the respective value by a sum of the values in the count vector 122. The sum of the values in the count vector 122 is 23 (1+1+1 2+3+3+3). Accordingly, the quotient vector 124 is <0.05, 0.05, 0.6, 0.15, 0.15, 0.15>.

3. Binary Vector

The vector module 112 calculates, based on the quotient vector 124 and a threshold 126, a binary vector 128 storing a list of values in a plurality of slots. The binary vector represents the file, and each slot of the binary vector 128 corresponds to a character of the set of distinct characters 120 based on the order. Accordingly, each slot of the binary vector 128 corresponds to the same character as the respective slots of the count vector 122 and the quotient vector 124. Additionally, the threshold 126 is configurable. A user or the system may change the threshold 126 to fine tune the format prediction. The binary vector 128 provides important information regarding the structure of a file such as the frequency with which a particular character is found compared to other characters in the file.

To calculate the binary vector 128, the vector module 112 compares each value in the quotient vector 124 to the threshold 126. A slot of the binary vector 122 stores one of two possible values (e.g., 0 and 1). For example, for each slot of the binary vector 128, the vector module 112 stores a first value (e.g., 1) in the slot if the respective slot (same slot number) of the quotient vector 124 satisfies the threshold 126 and stores a second value (e.g., 0) in the slot if the respective slot of the quotient vector 124 does not satisfy the threshold 126. In an example, a slot of the quotient vector satisfies the threshold 126 if a value stored in the slot is greater than the threshold 126, and the slot of the quotient vector does not satisfy the threshold 126 if the value stored in the slot is not greater than the threshold 126. In another example, a slot of the quotient vector satisfies the threshold 126 if a value stored in the slot is not greater than the threshold 126, and the slot of the quotient vector does not satisfy the threshold 126 if the value stored in the slot is greater than the threshold 126. In an example, the threshold 126 is 0.12, and the resulting binary vector 128 is <0, 0, 1, 1, 1, 0>.

B. Classify File as Being Specific to a Given Format

The classification module 114 classifies the binary vector 128 as being specific to a particular format. The user may provide inputs into the computing system 102 for classification of a file and/or binary vector. In an example, the user provides the file 104 to the computing system 102 and labels the file 104 as being specific to a given file format. In this example, the vector module 112 calculates the binary vector, and the classification module 114 classifies the binary vector computed by the vector module 112 as being specific to the format provided by the user. In another example, the user provides the binary vector to the computing system 102 and labels the binary vector as being specific to a given format. In this example, the vector module 112 does not calculate the binary vector. Rather, the classification module 114 receives the binary vector and classifies the binary vector provided by the user as being specific to the format provided by the user.

The classification module 114 stores the binary vector 128 and an association between the binary vector 128 and the particular format into the data store 106. Each entry in the data store 106 may correspond to the content of a file and the user's label specifying the file format. Using the techniques provided in the present disclosure, the vector module 112 and the classification module 114 may search for particular features (e.g., a large number of "<" characters in the file relative to other non-alphanumeric characters) in the file, and the prediction module 116 understands a particular pattern in order to predict the file format. The pattern may correspond to the frequency with which one or more non-alphanumeric characters are found in a file and/or the keywords (or a frequency of the keywords) found in the file.

In FIG. 1, the classification module 114 classifies the binary vector 128 <0, 0, 1, 1, 1, 0> as being specific to the JSON format. A format may be, for example, JSON, Extensible Markup Language (XML), Hypertext Markup Language (HTML), Yet Another Markup Language (YAML), or a console format (e.g., Apache or Nginx). A console format indicates that the content stored in the file is text that was captured from a shell execution (e.g., Jenkins console text). In particular, the content stored in the file is an output from an application. If the file is associated with a console format, example formats may be Java-console, Ruby-console, Python-console, and JavaScript-console. More details on the console format are found further below.

Table B provides another example file that is provided to the computing device 102:

TABLE B

Sample2.txt
- hostname: "eu-12-app-1"

TABLE B-continued

- exceptions: 0
- exception_list:
  - KeyError
  - Agent.Off

The vector module 112 identifies the set of distinct characters 120 and may perform the actions discussed in the present disclosure to calculate vectors. In particular, the vector module 112 calculates, based on the "Sample2.txt" file, the count vector <0, 0, 2, 3, 0, 5>. The vector module 112 calculates, based on the count vector, the quotient vector <0, 0, 0.2, 0.3, 0, 0.5>. After the quotient vector is calculated, the vector module 112 calculates, based on the quotient vector and a threshold, the binary vector <0, 0, 1, 1, 0, 1>. The user may provide to the classification module 114 an input indicating that the "Sample2.txt" file is specific to the YAML format. In this example, the classification module 114 classifies the binary vector <0, 0, 1, 1, 0, 1> as being specific to the YAML format and stores this association into data store 106.

Based on the associations in the data store 106, the prediction module 116 may predict, based on the binary vector and its associated format, a format of a binary vector or a file. It should be understood that a prediction of a format of a binary vector also refers to a prediction of a format of a file from which the binary vector is based.

III. PREDICT FORMAT OF A FILE

A. Binary Vector that Represents the File is Found in the Data Store

Figure 2:
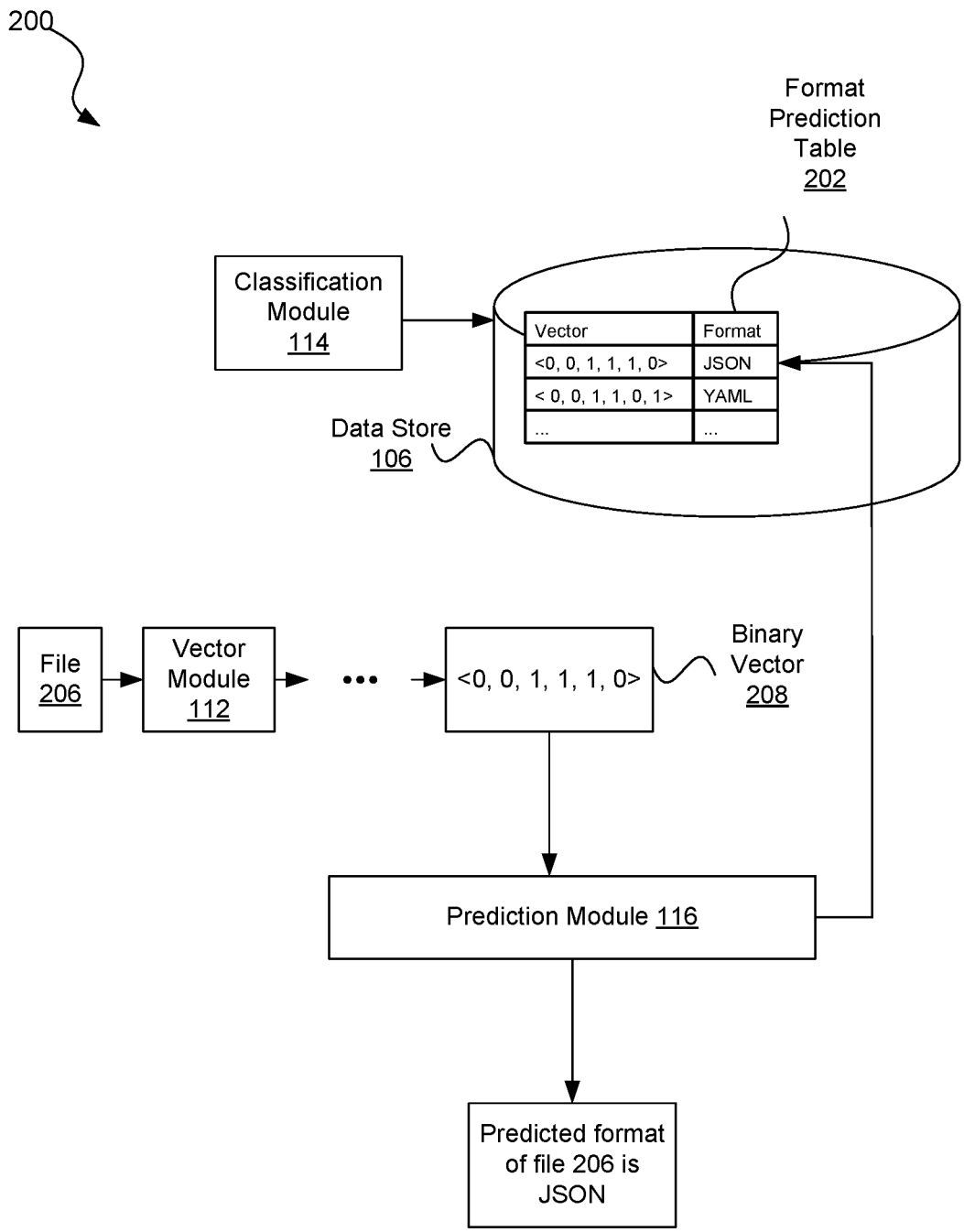
FIG. 2 illustrates an example flow diagram for predicting a format of a file if the binary vector is stored in the data store, according to one example of principles described herein.

FIG. 2 illustrates an example flow diagram 200 for predicting a format of a file if the binary vector is stored in the data store, according to one example of principles described herein. In FIG. 2, the data store 106 includes a format prediction table 202. Each entry of the format prediction table 202 includes a binary vector and its associated format. In an example, a first entry provides an association between the binary vector <0, 0, 1, 1, 1, 0> and the JSON format, indicating that the binary vector <0, 0, 1, 1, 1, 0> is specific to the JSON format. A second entry provides an association between the binary vector <0, 0, 1, 1, 0, 1> and the YAML format, indicating that the binary vector <0, 0, 1, 1, 0, 1> is specific to the YAML format. The information stored in the format prediction table 202 may be a training set that is used by the prediction module 116 to predict a format of a file.

In FIG. 2, the vector module 112 processes a file 206. The vector module 112 calculates vectors based at least in part on the file 206, and the prediction module 116 predicts a format of the file 206. Table C provides an example of the file 206:

TABLE C file.txt
{
"agent": {
"host": "localhost-hello.XX",
"version": "alpha-v2",
"commit": "ab2937cd102d",
"id": "7839487di9ab321"
},
"cpu_perc": 10,
"cpu_cores": 5,
"cache_mb": 10240,
"ram_perc": 40, TABLE C-continued "ram_total_mb": 1024
}

As discussed above, the vector module 112 calculates, based on the file 206, a count vector <2, 2, 28, 10, 8, 2>. The sum of the values in the count vector is 52, and the vector module 112 divides each of the values in the count vector by 52 to calculate the quotient vector. Accordingly, the quotient vector is <0.04, 0.04, 0.53, 0.19, 0.15, 0.04>. In an example, the threshold 126 is 0.12, and for each value in the quotient vector, the vector module 112 determines whether the respective value is greater than or equal to 0.12. For the file 206, the vector module 112 calculates a binary vector 208, which is <0, 0, 1, 1, 1, 0>.

The prediction module 116 receives the binary vector 208 and searches the data store 106 for the binary vector. The first entry of the format prediction table 202 stores the binary vector 208. In response to finding the binary vector 208 in the data store 106, the prediction module 116 identifies JSON as the format associated with the binary vector 208. The format associated with the binary vector is the predicted format of the file. Accordingly, the prediction module 116 predicts that JSON is the format of the file 206. Likewise, if the vector module 112 calculates the binary vector <0, 0, 1, 1, 0, 1> for another file, the prediction module 116 predicts that a format of this file is YAML.

B. Binary Vector that Represents the File is Not Found in the Data Store

In some examples, the binary vector generated by the vector module 112 is not found in the data store 106. The prediction module 116 may engage in other actions to predict the file format if the binary vector is not stored in the data store 106.

Figure 3:
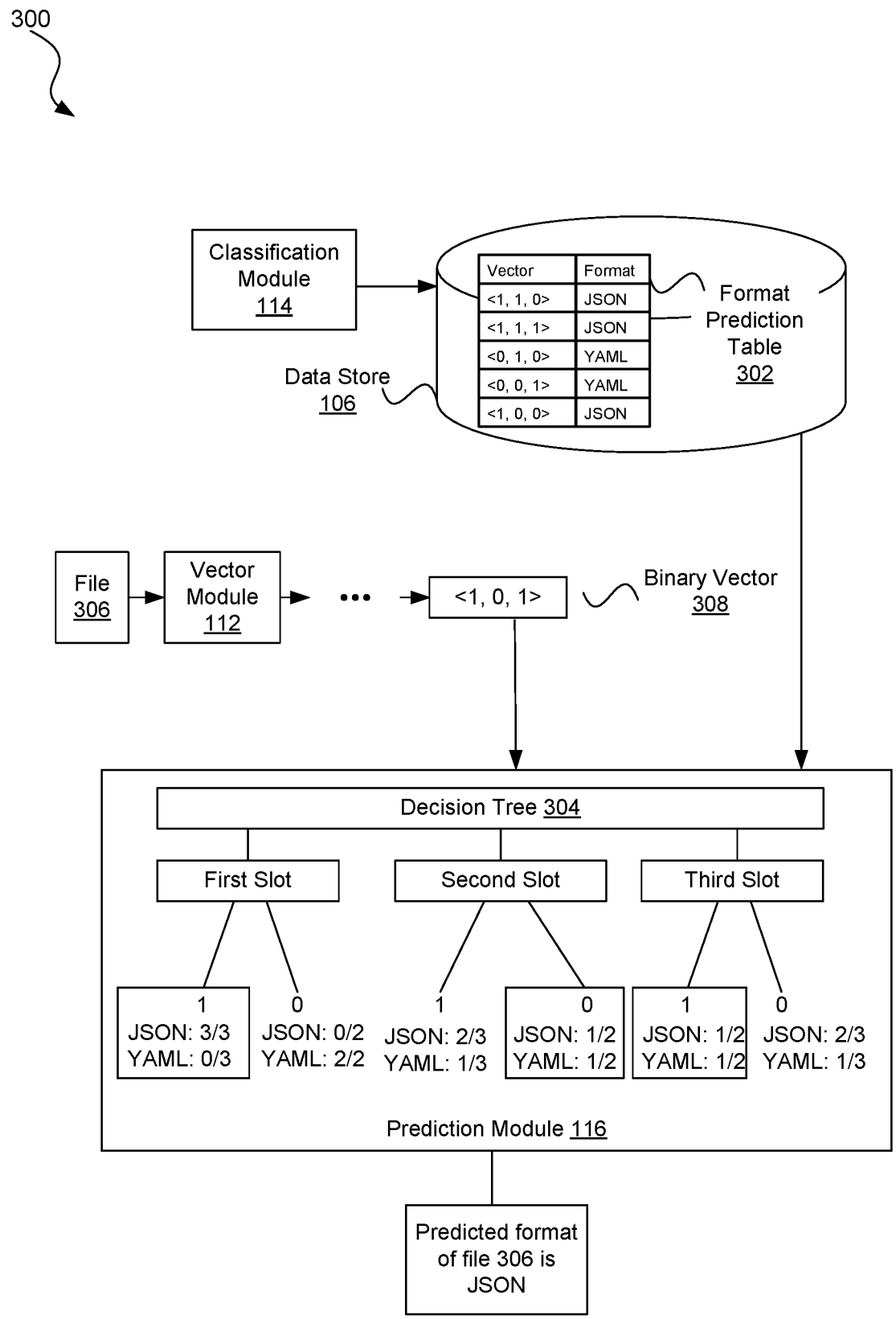
FIG. 3 illustrates an example flow diagram for predicting a file format if the binary vector is not stored in the data store, according to one example of principles described herein.

FIG. 3 illustrates an example flow diagram 300 for predicting a file format if the binary vector is not stored in the data store, according to one example of principles described herein. In FIG. 3, the classification module 114 may store one or more entries in a format prediction table 302 that is stored in the data store 106. As discussed, the information stored in the format prediction table 302 may be a training set that is used by the prediction module 116 to predict a format of a file. In an example, the user provides the classification module 114 with the binary vector and the format specific to the binary vector. In another example, the user provides the file to the computing system 102 and the format specific to the file. The classification module 114 takes the binary vector that represents the file and stores the binary vector along with its associated format into the format prediction table 302.

Each entry of the format prediction table 302 includes a binary vector and an association between the binary vector and the format specific to the binary vector. In an example, a first entry provides an association between the binary vector <1, 1, 0> and JSON, a second entry provides an association between the binary vector <1, 1, 1> and JSON, a third entry provides an association between the binary vector <0, 1, 0> and YAML, a fourth entry provides an association between the binary vector <0, 0, 1> and YAML, and a fifth entry provides an association between the binary vector <1, 0, 0> and JSON.

Using the techniques disclosed in the present disclosure, the vector module 112 processes a file 306 and calculates a binary vector 308 for the file. The binary vector 308 is <1, 0, 1>. The prediction module 116 predicts, based on the binary vector 308, a format of the file 306. In an example, the prediction module 116 searches the data store 106 for the binary vector 308. The predicted format is the format associated with the binary vector 308 <1, 0, 1>, which is not found in the data store 106.

The prediction module 116 may implement additional actions in order to provide a prediction of the format of the file 306. In response to not finding the binary vector in the data store 106, the prediction module 116 may create, based on the format prediction table 302, a decision tree 304. For one or more slots of the binary vector 308, the prediction module 116 identifies a value stored in the respective slot, computes a first probability that the first binary vector storing the value in the respective slot is specific to a first format, and computes a second probability that the first binary vector storing the value in the respective slot is specific to a second format.

The prediction module 116 determines that the first slot of the binary vector 308 stores the value "1," three binary vectors store the value "1" and are specific to JSON, and zero binary vectors store the value "1" and are specific to YAML. The prediction module 116 calculates a total sum, which is a sum of a first number of binary vectors storing the value "1" and specific to JSON and a second number of binary vectors storing the value "1" and specific to YAML. In this example, the prediction module 116 may compute the first probability by dividing the number of binary vectors storing the value "1" and specific to JSON by the total sum. In particular, the prediction module 116 computes the first probability of 3/3 or 100% that the binary vector 308 storing the value "1" in the first slot is specific to JSON. Additionally, the prediction module 116 may compute the second probability by dividing the number of binary vectors storing the value "1" and specific to YAML by the total sum. In particular, the prediction module 116 computes the second probability 0/3 of 0% that the binary vector 308 storing the value "1" in the first slot is specific to YAML.

In some examples, prediction module 116 computes a third probability of 0% that the binary vector 308 storing the other value "0" in the first slot is specific to JSON and computes a fourth probability of 100% that the binary vector 308 storing the other value "0" in the first slot is specific to YAML.

The prediction module 116 may compute one or more of the aforementioned probabilities for one or more slots of the binary vector 308. The prediction module 116 uses the decision tree to predict the format of the file 306, and the probabilities of interest in the decision tree 304 are surrounded by boxes. The prediction module 116 calculates a first sum of the one or more first probabilities and calculates a second sum of the one or more second probabilities. The first sum is 2 (3/3+½+½) and is associated with the JSON format, and the second sum is 1 (0+½+½) and is associated with the YMAL format. The prediction module 116 predicts that the binary vector 308 is specific to the JSON format if the first sum is greater than the second sum and predicts that the binary vector 308 is specific to the YMAL format if the second sum is greater than the first sum. In the example illustrated in FIG. 2, the first sum is greater than the second sum, and hence it is more likely that the binary vector 308 is specific to the JSON format. Accordingly, the prediction module 116 predicts the file 306 as being specific to JSON.

In an example, after the prediction module 116 predicts the format of the file, the prediction module 116 may send the file to the correct file processor (e.g., a fluentd instance that is specific to JSON or a fluentd instance that is specific to Java-console), which breaks down the data into a format that a database can search efficiently. In an example, the database is ElasticSearch®. The correct file processor is the file processor that is specific to the format.

In another example, after the prediction module 116 predicts the format of the file, the prediction module 116 sends a message specifying the format and a file path on which the file is stored to a service. The service receives the message, finds the file on the specified file path, and sends the file to the correct file processor. The correct file processor may parse the file in accordance with the file's format and send the parsed data to the database (e.g., ElasticSearch®). At a later point in time, a user may connect to and query the database. The database may store a vast amount of information that has been collected from various data sources.

Additionally, a user of the computing system 102 may add additional file formats using the techniques herein.

IV. EXAMPLE METHODS

A. Predict a File Format Based on a Binary Vector that Represents the File

Figure 4:
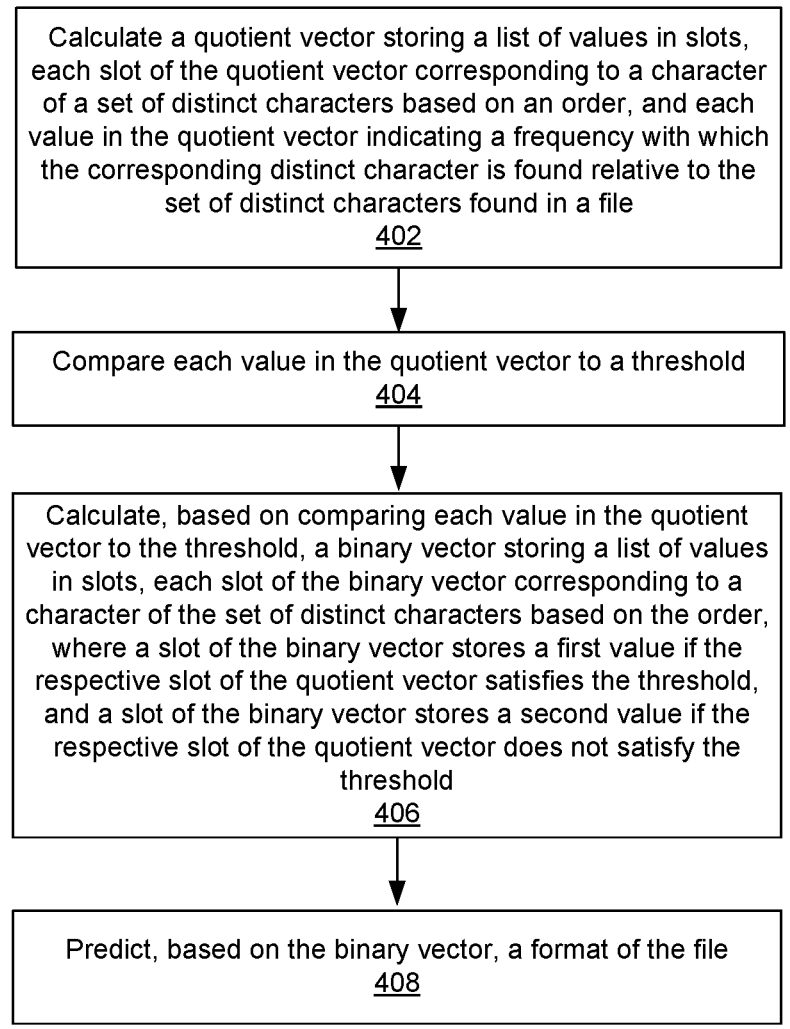
FIG. 4 is a flowchart showing an illustrative method of predicting a format of a file, according to one example of principles described herein.

FIG. 4 is a flowchart showing an illustrative method 400 for predicting a format of a file, according to one example of principles described herein. The method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof.

In FIG. 4, at action 402, the vector module 112 calculates a quotient vector storing a list of values in slots, each slot of the quotient vector corresponding to a character of a set of distinct characters based on an order, and each value in the quotient vector indicating a frequency with which the corresponding distinct character is found relative to the set of distinct characters found in a file. In an example, each character of the set of distinct characters is a non-alphanumeric character. The quotient vector provides an indication of the frequency of a particular character relative to others in the file.

At action 404, the vector module 112 compares each value in the quotient vector to a threshold. In an example, the threshold is configurable. At action 406, the vector module 112 calculates, based on comparing each value in the quotient vector to the threshold, a binary vector storing a list of values in slots, each slot of the binary vector corresponding to a character of the set of distinct characters based on the order, where a slot of the binary vector stores a first value if the respective slot of the quotient vector satisfies the threshold, and a slot of the binary vector stores a second value if the respective slot of the quotient vector does not satisfy the threshold.

At action 408, the prediction module 116 predicts, based on the binary vector, a format of the file. As is further explained below, if the prediction module 116 predicts that a file is specific to the console format, the prediction module 116 digs one level deeper and determines the programming language in which the application was written.

It is also understood that additional processes may be inserted before, during, or after blocks 402-408 discussed above. It is also understood that one or more of the blocks of method 400 described herein may be omitted, combined, or performed in a different sequence as desired.

B. File is Specific to a Console Format

Figure 5:
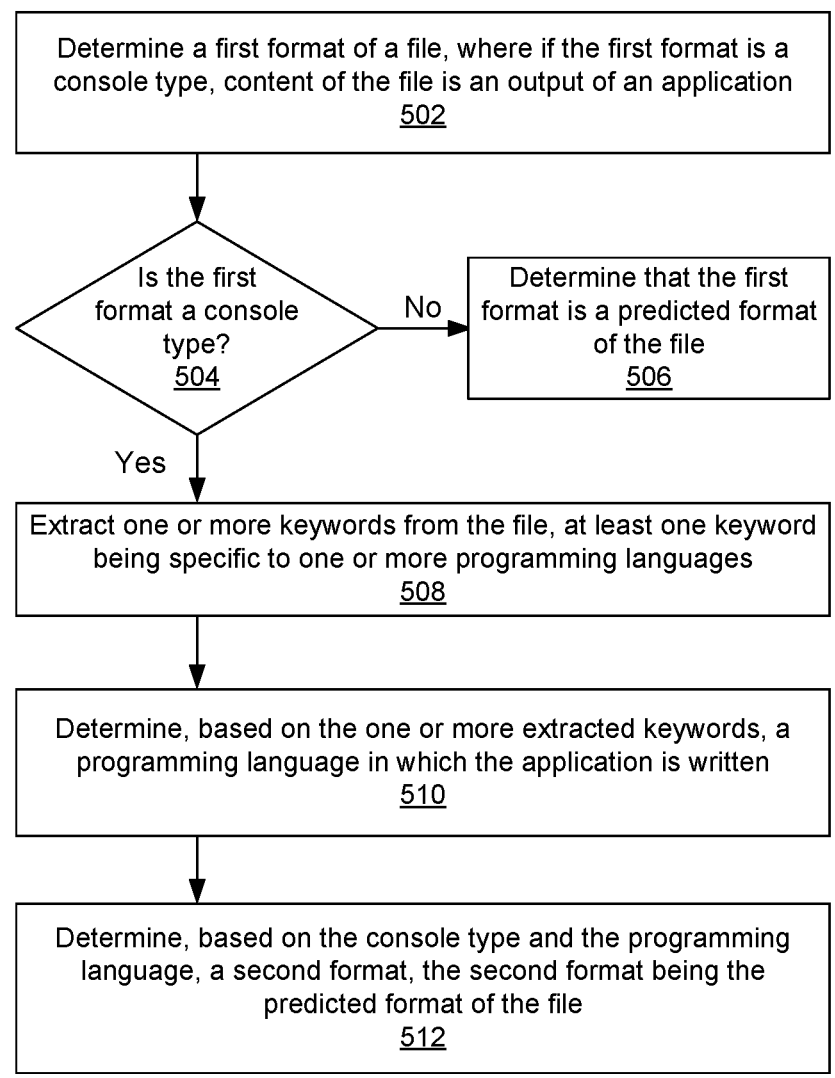
FIG. 5 is a flowchart showing an illustrative method of predicting a format of a file if it is specific to a console format, according to one example of principles described herein.

FIG. 5 is a flowchart showing an illustrative method 500 for predicting a format of a file if it is specific to a console format, according to one example of principles described herein. The method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof.

In FIG. 5, at action 502, the prediction module 116 determines a first format of a file, where if the first format is a console type, content of the file is an output of an application. At action 504, the prediction module 116 determines whether the first format is a console type. The number of non-alphanumeric characters found in a file specific to the console format is low. In an example, the prediction module 116 divides the number of non-alphanumeric characters stored in the file by the total characters stored in the file and determines whether the resulting quotient satisfies a console threshold. The console threshold may be less than, the same as, or greater than the threshold 126. In an example, the resulting quotient satisfies the console threshold if the resulting quotient is less than the console threshold. A resulting quotient that is close to zero may indicate that the file is specific to the console format. A file that is specific to the console format may store characters that are not displayed in a file that is specific to a non-console format (e.g., JSON). For example, a JSON file may have a large number of the """, ":", and "," non-alphanumeric characters, whereas a file specific to the console format may store relatively few non-alphanumeric characters.

If the first format is not a console type, the process flow of method 500 proceeds from action 504 to action 506. At action 506, the prediction module 116 determines that the first format is a predicted format of the file. If the format is a console type, the process flow of method 500 proceeds from action 504 to action 508. At action 508, the prediction module 116 extracts one or more keywords from the file, at least one keyword being specific to one or more programming languages. The content stored in a file specific to a console format is an output from an application. If the prediction module 116 determines that a binary vector is specific to the console format, the prediction module 116 digs one level deeper and determines the programming language in which the application was written.

In an example, the file is a log file, and the prediction module 116 extracts one or more keywords from an exception in the log file. A keyword may be, for example, "Traceback," "error message," or "Java." A file including one or more particular keywords or including a large number of occurrences of a particular keyword may indicate a particular programming language in which the application is written. For example, a file that stores an output of a Java program may include the keyword "java" numerous times. The keyword "java" may be unique to the Java programming language and thus indicate that the file's format is the Java-console format. In another example, a file that stores an output of a Python program may include the keyword "Traceback," which may be unique to the Python programming language and thus indicate that the file format is the Python-console format. A format may be, for example, Java-console, Ruby-console, or Python-console.

In another example, for one or more extracted keywords, the prediction module 116 determines a number of times the respective extracted keyword is found in the file. The prediction module 116 may use this knowledge to predict the format of the file. For example, a large number of occurrences of the keyword "java" in the file may provide the prediction module 116 with a hint that the programming language in which the application was written is Java. Additionally, the prediction module 116 may have knowledge of characters that are invalid for particular formats. The prediction module 116 may use this knowledge to determine that a file is not specific to a particular format.

At action 510, the prediction module 116 determines, based on the one or more extracted keywords, a programming language in which the application is written. At action 512, the prediction module 116 determines, based on the console type and the programming language, a second format of the file, the second format being the predicted format of the file.

It is also understood that additional processes may be inserted before, during, or after blocks 502-512 discussed above. It is also understood that one or more of the blocks of method 500 described herein may be omitted, combined, or performed in a different sequence as desired.

IV. EXAMPLE SYSTEM FLOW

Figure 6:
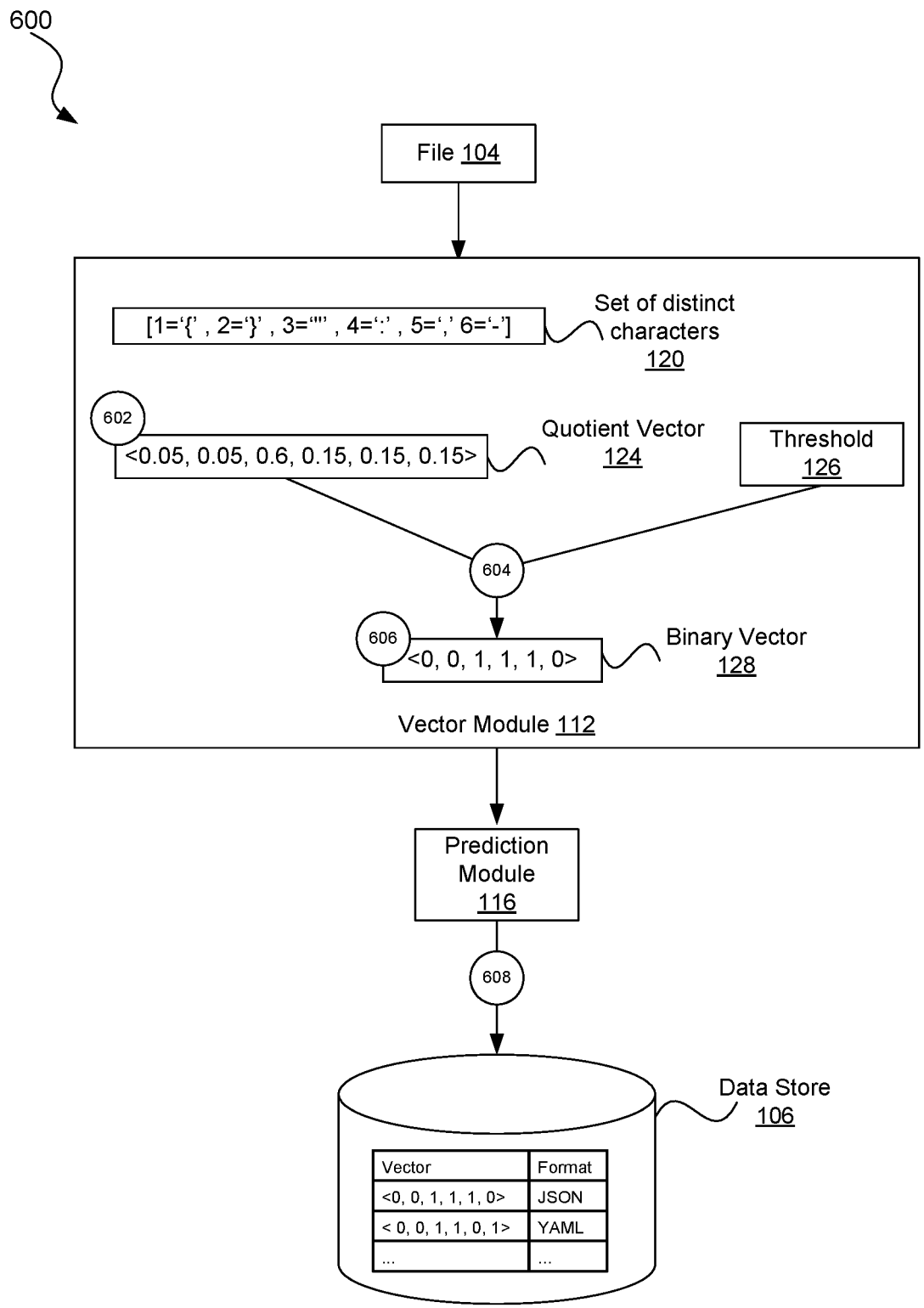
FIG. 6 is a diagram showing an example system flow for predicting a format of a file, according to one example of principles described herein.

FIG. 6 is a diagram showing an example system flow 600 for predicting a format of a file, according to one example of principles described herein. The method 600 may be performed by processing logic that may include hardware (e.g., circuitry, dedicated logic, programmable logic and microcode), software (such as instructions run on a computer system, specialized hardware, dedicated machine, or processing device), firmware, or a combination thereof.

In FIG. 6, at action 602, the vector module 112 calculates the quotient vector 124 storing a list of values in six slots. Each slot of the quotient vector 124 corresponds to a character of the set of distinct characters 120 and is based on the same order as the set of distinct characters 120. For example, the first slot of quotient vector 124 corresponds to the first element of the set of distinct characters 120, the second slot of quotient vector 124 corresponds to the second element of the set of distinct characters 120, the third slot of quotient vector 124 corresponds to the third element of the set of distinct characters 120, the fourth slot of quotient vector 124 corresponds to the fourth element of the set of distinct characters 120, the fifth slot of quotient vector 124 corresponds to the fifth element of the set of distinct characters 120, and the sixth slot of quotient vector 124 corresponds to the sixth element of the set of distinct characters 120. Each value in the quotient vector 124 indicates a frequency with which the corresponding distinct character is found relative to the set of distinct characters 120 found in the file 104.

At action 604, the vector module 112 compares each value in the quotient vector 124 to the threshold 126. At action 606, the vector module 112 calculates, based on comparing each value in the quotient vector 124 to the threshold 126, the binary vector 128 storing a list of values in slots. Each slot of the binary vector 128 corresponds to a character of the set of distinct characters based on the order. The binary vector 128 stores one of two values in each slot. In an example, slot of the binary vector 128 stores a first value if the respective slot of the quotient vector 124 satisfies the threshold 126, and a slot of the binary vector 128 stores a second value if the respective slot of the quotient vector 124 does not satisfy the threshold 126. At action 608, the prediction module 116 predicts, based on the binary vector 128, a format of the file 104.

In various implementations, the parser 110, classification module 114, vector module 112, and prediction module 116 execute on a computer system having a memory and one or more processors. The computer system may include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a central processing unit (CPU) or computer is adapted to read. The one or more storage devices may include stored information that may be made available to one or more computing devices and/or computer programs (e.g., clients) coupled to a computing device using a computer network (not shown). The computer network may be any type of network including a LAN, a WAN, an intranet, the Internet, a cloud, and/or any combination of networks thereof that is capable of interconnecting computing devices and/or computer programs in the system.

The computer system includes a bus or other communication mechanism for communicating information data, signals, and information between various components of the computer system. The components include an I/O component that processes a user action, such as selecting keys from a keypad/keyboard or selecting one or more buttons or links, and sends a corresponding signal to the bus. In an example, a user may provide a file and/or binary vector and its corresponding format using the I/O component. The I/O component may also include an output component such as a display, and an input control such as a cursor control (such as a keyboard, keypad, or mouse).

The computer system may include a transceiver or network interface that transmits and/or receives signals between the computer system and other devices via a communications link to a network. In an example, the transmission is wireless, although other transmission mediums and methods may also be suitable. A central processing unit (CPU), which may be a micro-controller, digital signal processor (DSP), or other processing component, processes these various signals, such as for display on the computer system or transmission to other devices via the communications link. The CPU may also control transmission of information, such as cookies or IP addresses, to other devices.

Components of the computer system also include a system memory component (e.g., RAM), a static storage component (e.g., ROM), and/or a disk drive. The computer system performs specific operations by the CPU and other components by executing one or more sequences of instructions contained in the system memory component. Logic may be encoded in a computer readable medium, which may refer to any medium that participates in providing instructions to the CPU for execution. Such a medium may take many forms, including but not limited to, non-volatile media, volatile media, and transmission media.

In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., method 400 and/or method 500) to practice the present disclosure may be performed by the computer system. In various other examples, a plurality of computer systems coupled by communication links to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks, steps, or actions described herein may be changed, combined into composite blocks, steps, or composite actions, and/or separated into sub-blocks, sub-steps, or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method, comprising:
   calculating a quotient vector storing a first list of values in slots, each slot of the quotient vector corresponding to a character of a set of distinct characters based on an order, and each value in the quotient vector indicating a frequency with which the corresponding distinct character is found relative to the set of distinct characters found in a file;
   comparing each value in the quotient vector to a threshold;
   calculating, based on comparing each value in the quotient vector to the threshold, a binary vector storing a second list of values in slots, each slot of the binary vector corresponding to a character of the set of distinct characters based on the order, wherein a slot of the binary vector stores a first value if the respective slot of the quotient vector satisfies the threshold, and a slot of the binary vector stores a second value if the respective slot of the quotient vector does not satisfy the threshold;
   determining whether a data store stores an association between the binary vector and a format;
   determining that the file is in the format in response to determining that the data store stores the association; and
   routing the file to a file processing instance that is specific to the format and processes the file in accordance with the format.

2. The method of claim 1, further comprising:
   identifying a set of distinct characters arranged in the order.

3. The method of claim 1, further comprising:
   calculating a count vector storing a third list of values in slots, each slot of the count vector corresponding to a character of the set of distinct characters based on the order, and each value in the count vector representing a number of times the respective character is found in the file, wherein calculating the quotient vector includes for each value stored in the count vector, dividing the respective value by a sum of the values in the count vector.

4. The method of claim 1, further comprising:
   classifying the binary vector as being specific to the format, the binary vector being calculated based on a second file different from the first file.

5. The method of claim 1, further comprising:
   receiving a user input indicating that the binary vector is specific to the format; and
   classifying the binary vector as being specific to the format by storing the binary vector and the association between the binary vector and the format into the data store.

6. The method of claim 1, further comprising for one or more files:
   receiving a user input indicating that the respective file is specific to a given format;
   calculating a second quotient vector storing a fourth list of values in slots, each slot of the second quotient vector corresponding to the same character as the respective slot of the first quotient vector, and each value in the second quotient vector indicating a frequency with which the corresponding distinct character is found relative to the set of distinct characters found in the respective file;
   comparing each value in the second quotient vector to the threshold;
   calculating, based on comparing each value in the second quotient vector to the threshold, a second binary vector storing a fifth list of values in slots, each slot of the second binary vector corresponding to the same character as the respective slot of the second quotient vector, wherein a slot of the second binary vector stores the first value if the respective slot of the second quotient vector satisfies the threshold, and a slot of the second binary vector stores the second value if the respective slot of the second quotient vector does not satisfy the threshold; and
   classifying the second binary vector as being specific to the given format by storing the second binary vector and an association between the second binary vector and the given format into a data store.

7. The method of claim 1, further comprising:
   in response to determining that the data store does not store the association, for one or more slots of the binary vector:
   identifying a value stored in the respective slot;
   computing a first probability that the binary vector storing the value in the respective slot is specific to a first format; and computing a second probability that the binary vector storing the value in the respective slot is specific to a second format;
calculating a first sum of the one or more first probabilities; and
calculating a second sum of the one or more second probabilities, wherein the determined format is the first format if the first sum is greater than the second sum, and the determined format is the second format if the second sum is greater than the first sum.

8. The method of claim 1, further comprising:
determining whether the format is a console type, wherein if the format is the console type, content of the file is an output of an application; and
in response to a determination that the format is the console type:
extracting one or more keywords from the file, at least one keyword being specific to one or more programming languages;
determining, based on the one or more extracted words, a programming language in which the application is written, wherein the determining includes determining, based on the console type and the programming language, the format of the file.

9. The method of claim 8, wherein the first value is zero, the method further comprising:
if the binary vector does not store the first value in each slot of the binary vector, determining that the format is not the console type; and
if the binary vector stores the first value in each slot of the binary vector: determining that the format is the console type.

10. The method of claim 8, further comprising:
in response to the determination that the format is the console type, for one or more extracted keywords, determining a number of times the respective extracted keyword is found in the file, wherein the determining further includes determining, based on the number of times the respective extracted keyword is found in the file, the format of the file.

11. A system, comprising:
a vector module that calculates a quotient vector storing a first list of values in slots, wherein each slot of the quotient vector corresponds to a character of a set of distinct characters based on an order, and each value in the quotient vector indicates a frequency with which the corresponding distinct character is found relative to the set of distinct characters found in a file,
wherein the vector module compares each value in the quotient vector to a threshold and calculates, based on comparing each value in the quotient vector to the threshold, a binary vector storing a second list of values in slots, wherein each slot of the binary vector corresponds to a character of the set of distinct characters based on the order, and wherein a slot of the binary vector stores a first value if the respective slot of the quotient vector satisfies the threshold, and a slot of the binary vector stores a second value if the respective slot of the quotient vector does not satisfy the threshold; and
a prediction module that determines whether a data store stores an association between the binary vector and a format, wherein in response to a determination that the data store stores the association in the data store, the prediction module determines that the file is in the format and routes the file to a file processing instance that is specific to the format and processes the file in accordance with the format.

12. The system of claim 11, wherein each file processing instance of a plurality of instances is specific to a particular format.

13. The system of claim 11, wherein the vector module calculates a count vector storing a third list of values in slots, wherein each slot of the count vector corresponds to a character of the set of distinct characters based on the order, and each value in the count vector represents a number of times the respective character is found in the file.

14. The system of claim 13, wherein for each value stored in the count vector, the vector module divides the respective value by a sum of the values in the count vector to calculate the quotient vector.

15. The system of claim 11, wherein the data store stores one or more associations between a given binary vector and a given format.

16. The system of claim 11, wherein the prediction module searches the data store for the binary vector.

17. The system of claim 11, wherein in response to a determination that the data store does not store the association in the data store, for one or more slots of the binary vector, the prediction module identifies a value stored in the respective slot, computes a first probability that the binary vector storing the value in the respective slot is specific to a first format, and computes a second probability that the binary vector storing the value in the respective slot is specific to a second format, wherein the prediction module calculates a first sum of the one or more first probabilities and calculates a second sum of the one or more second probabilities, and wherein the predicted format is the first format if the first sum is greater than the second sum, and the predicted format is the second format if the second sum is greater than the first sum.

18. The system of claim 11, wherein the prediction module determines whether the format is a console type, wherein if the format is the console type, content of the file is an output of an application, wherein in response to a determination that the format is the console type, the prediction module extracts one or more keywords from the file and determines, based on the one or more extracted words, a programming language in which the application is written, wherein at least one keyword is specific to one or more programming languages, wherein the prediction module determines, based on the console type and the programming language, the format of the file.

19. A non-transitory machine readable medium comprising a plurality of machine-readable instructions that when executed by one or more processors is adapted to cause the one or more processors to perform a method comprising:
calculating a quotient vector storing a first list of values in slots, each slot of the quotient vector corresponding to a character of a set of distinct characters based on an order, and each value in the quotient vector indicating a frequency with which the corresponding distinct character is found relative to the set of distinct characters found in a file;
comparing each value in the quotient vector to a threshold;
calculating, based on comparing each value in the quotient vector to the threshold, a binary vector storing a second list of values in slots, each slot of the binary vector corresponding to a character of the set of distinct characters based on the order, wherein a slot of the binary vector stores a first value if the respective slot of the quotient vector satisfies the threshold, and a slot of the binary vector stores a second value if the respective slot of the quotient vector does not satisfy the threshold;

determining whether a data store stores an association between the binary vector and a format;

determining that the file is in the format in response to determining that the data store stores the association; and routing the file to a file processing instance that is specific to the format and processes the file in accordance with the format.

20. The machine-readable medium of claim 19, the method further comprising:

in response to determining that the data store does not store the association, for one or more slots of the binary vector:

identifying a value stored in the respective slot;

computing a first probability that the binary vector storing the value in the respective slot is specific to a first format; and computing a second probability that the binary vector storing the value in the respective slot is specific to a second format;

calculating a first sum of the one or more first probabilities; and calculating a second sum of the one or more second probabilities, wherein the determined format is the first format if the first sum is greater than the second sum, and the determined format is the second format if the second sum is greater than the first sum.

* * * * *